(12) United States Patent
Fantoni et al.

(10) Patent No.: US 9,267,012 B2
(45) Date of Patent: Feb. 23, 2016

(54) FLUOROELASTOMER COMPOSITION

(75) Inventors: Matteo Fantoni, Rho Milan (IT); Marco Apostolo, Bellinzago (IT); Marco Avataneo, Milan (IT); Giuseppe Marchionni, Milan (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 337 days.

(21) Appl. No.: 13/809,421

(22) PCT Filed: Jul. 8, 2011

(86) PCT No.: PCT/EP2011/061597
§ 371 (c)(1),
(2), (4) Date: Jan. 10, 2013

(87) PCT Pub. No.: WO2012/007374
PCT Pub. Date: Jan. 19, 2012

(65) Prior Publication Data
US 2013/0109797 A1     May 2, 2013

(30) Foreign Application Priority Data
Jul. 14, 2010 (EP) .................................... 10169571

(51) Int. Cl.
*C08L 27/18* (2006.01)
*C08K 5/06* (2006.01)
*C08L 51/08* (2006.01)
*C08L 53/00* (2006.01)

(52) U.S. Cl.
CPC . *C08K 5/06* (2013.01); *C08L 27/18* (2013.01); *C08L 51/08* (2013.01); *C08L 53/00* (2013.01)

(58) Field of Classification Search
CPC ....................................................... C08L 27/18
See application file for complete search history.

(56) References Cited

U.S. PATENT DOCUMENTS

| | | | |
|---|---|---|---|
| 3,752,787 A | 8/1973 | De Brunner | |
| 3,876,654 A | 4/1975 | Pattison | |
| 4,035,565 A | 7/1977 | Apotheker et al. | |
| 4,243,770 A | 1/1981 | Tatemoto et al. | |
| 4,259,463 A | 3/1981 | Moggi et al. | |
| 4,278,776 A | 7/1981 | Mauro et al. | |
| 4,281,092 A | 7/1981 | Breazeale | |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Naraki et al. | |
| 4,946,936 A * | 8/1990 | Moggi et al. | 528/392 |
| 5,173,553 A | 12/1992 | Albano et al. | |
| 5,268,405 A * | 12/1993 | Ojakaar et al. | 524/366 |
| 5,447,993 A | 9/1995 | Logothetis | |
| 5,585,449 A * | 12/1996 | Arcella et al. | 526/247 |
| 5,767,204 A | 6/1998 | Iwa et al. | |
| 5,789,489 A | 8/1998 | Coughlin et al. | |
| 5,789,509 A | 8/1998 | Schmiegel | |
| 2004/0236028 A1 | 11/2004 | Hung et al. | |
| 2007/0093608 A1* | 4/2007 | Bish et al. | 525/326.2 |
| 2010/0105584 A1* | 4/2010 | Avataneo et al. | 508/155 |

FOREIGN PATENT DOCUMENTS

| | | |
|---|---|---|
| EP | 0120462 A1 | 10/1984 |
| EP | 0136596 A2 | 4/1985 |
| EP | 0182299 A2 | 5/1986 |
| EP | 0199138 A2 | 10/1986 |
| EP | 0222408 A2 | 5/1987 |
| EP | 0320005 A2 | 6/1989 |
| EP | 0335705 A1 | 10/1989 |
| EP | 0410351 A1 | 1/1991 |
| EP | 0661304 A1 | 7/1995 |
| EP | 0684277 A1 | 11/1995 |
| EP | 0842980 A2 | 5/1998 |
| EP | 0860436 A1 | 8/1998 |
| EP | 2100909 A1 * | 9/2009 |
| WO | WO 9502634 A1 | 1/1995 |
| WO | WO 9705122 A1 | 2/1997 |
| WO | WO 2008065163 A1 | 6/2008 |
| WO | WO 2008065165 A1 | 6/2008 |
| WO | WO 2009112577 A1 | 9/2009 |

* cited by examiner

*Primary Examiner* — Mark Kaucher

(57) ABSTRACT

The invention pertains to a (per)fluoroelastomer composition comprising:
at least one (per)fluoroelastomer [fluoroelastomer (A)]; and
from 0.1 to 30 weight parts, per hundred parts of fluoroelastomer (A), of at least one perfluoropolyether block copolymer [polymer (E)] comprising:
A) one or more (per)fluoropolyoxyalkylene segment (chain $R_f$), that is to say a segment comprising recurring units having at least one catenary ether bond and at least one fluorocarbon moiety, and
B) one or more polyalkylene segment (chain $R_a$) comprising recurring units of formula: —($CR_1R_2$—$CR_3R_4$)—
wherein $R_1$, $R_2$, $R_3$, $R_4$, equal to or different from each other, are selected from the group consisting of H, halogens (preferably F, Cl); $C_1$-$C_6$ (hydro)carbon groups, optionally containing fluorine or other heteroatoms, preferably perfluoroalkyl or (per)fluorooxyalkyl.

15 Claims, No Drawings

FLUOROELASTOMER COMPOSITION

CROSS-REFERENCE TO RELATED APPLICATIONS

This application is a U.S. national stage entry under 35 U.S.C. §371 of International Application No. PCT/EP2/011/061597 filed Jul. 8, 2011, which claims priority to European application No. 10169571.6 filed Jul. 14, 2010, the whole content of this application being incorporated herein by reference for all purposes.

TECHNICAL FIELD

The invention pertains to a (per)fluoroelastomer composition having improved processability and sealing behaviour both at high and low temperatures, to a curable compound comprising the same and to cured articles, in particular sealing articles comprising the same.

BACKGROUND ART

Vulcanized (per)fluoroelastomers are materials with excellent heat-resistance and chemical-resistance characteristics, which are generally used in the manufacture of technical articles such as sealing parts, pipes, oil seals and O-rings in which the leaktightness, the mechanical properties and the resistance to substances such as mineral oils, hydraulic fluids, solvents or chemical agents of diverse nature must be ensured over a wide range of working temperatures, from low to high temperatures.

A continuing need for (per)fluoroelastomers which can be easily processed yielding final parts endowed with improved leaktightness even at low temperatures combined with the outstanding mechanical properties (i.e. stress at break, modulus and elongation at break) typical of fluoroelastomer materials exists.

One of the approaches for improving processability of (per)fluoroelastomers is the use of lubricants and processing aids dispersed in the (per)fluoroelastomer matrix. However, when such lubricants/processing aids are not compatible with the matrix and/or when they possess high volatility or low thermal resistance, in particular when it is used at high concentrations, while processing can be improved, declines in the leaktightness and elongation at break properties (typical of elastic behaviour) are observed.

Perfluoropolyethers have been thus suggested as processing aids, due to their miscibility with the fluoroelastomeric matrix. EP 0222408 A (AUSIMONT SPA) May 20, 1987 discloses vulcanizable compositions of fluoroelastomers based on vinylidene fluoride, comprising a fluoropolyether as processing aid; similarly, U.S. Pat. No. 4,278,776 (MONTEDISON SPA) Jul. 14, 1981 discloses the use of perfluoropolyethers processing aids in VDF-based fluoroelastomers; in particular performances obtained with perfluoropolyether greases consisting of mixtures of an oil and PTFE particles were compared to those of a perfluoropolyether polyamide in curable fluoroelastomer compounds. In all these documents, adjunction of the perfluoropolyether processing adjuvant was found to be accompanied by a significant reduction of hardness and mechanical properties (modulus). Also, these materials, due to their inherent volatility, undergo migration phenomena and could exude from the cured parts in high temperature operating conditions, so that failures occur and performances of said parts are significantly affected. Finally these materials do not possess outstanding stiction (otherwise known as static friction) properties.

There is thus still a need in the art for (per)fluoroelastomer compositions possessing improved processability and still possessing outstanding sealing properties both at low and high temperatures, combined with outstanding mechanical properties (i.e. modulus and hardness) and outstanding stiction properties.

These stiction properties are of particular interest e.g. for the use of cured parts derived from (per)fluoroelastomer compositions in semiconductors manufacturing devices, both for static applications, wherein disassembly of the device is made easier and for dynamic applications, for instance when used for door sleeves, wherein low stiction values are of interest for enabling relative movement of the sealant and the substrate which is contacted to, with no risk of damage on the softer (per)fluoroelastomer article when detached from harder substrates like ceramic materials or aluminium.

SUMMARY OF INVENTION

The invention thus concerns a (per)fluoroelastomer composition comprising:
  at least one (per)fluoroelastomer [fluoroelastomer (A)]; and
  from 0.1 to 30 weight parts, per hundred parts of fluoroelastomer (A), of at least one perfluoropolyether block copolymer [polymer (E)] comprising:
  A) one or more (per)fluoropolyoxyalkylene segment (chain $R_f$), that is to say a segment comprising recurring units having at least one catenary ether bond and at least one fluorocarbon moiety, and
  B) one or more polyalkylene segment (chain $R_a$) comprising recurring units of formula: —$(CR_{1e}R_{2e}-CR_{3e}R_{4e})$—
  wherein $R_{1e}$, $R_{2e}$, $R_{3e}$, $R_{4e}$, equal to or different from each other, are selected from the group consisting of H, halogens (preferably F, Cl); $C_1$-$C_6$ (hydro)carbon groups, optionally containing fluorine or other heteroatoms, preferably perfluoroalkyl or (per)fluorooxyalkyl.

The Applicant has found that the addition of the polymer (E) to the fluoroelastomer (A), as above detailed, provides for curable compounds which are easily processed to give moulded and cured specimens having improved compression set and better performances both at high and low temperatures, while still maintaining hardness and modulus of bare fluoroelastomer matrix. Also, substantially neither migration phenomena nor leaching were advantageously observed, even after extensive thermal treatment, so that properties of the compound remain stable with time even in extreme operating conditions.

Further, the introduction of polymer (E) in the (per)fluoroelastomer composition of the invention has been surprisingly found to significantly improve static friction, providing very low stiction values, which make the inventive compositions particularly suitable for being used in semiconductors' manufacturing devices.

It has also been surprisingly found that the adjunction of polymer (E) advantageously provides for a completely compatible and homogeneous mixture with the fluoroelastomer (A), so that only one glass transition temperature ($T_g$) is observed by DSC analysis for such mixture; further, in addition, the $T_g$ of the inventive composition has been surprisingly found to be lower than that of the native fluoroelastomer (A), which could advantageously extend the operability window towards lower temperatures, in particular in case of perfluoroelastomers, which might suffer, when used without additive, from too high $T_g$ values.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable (per)fluorinated monomers are notably:

$C_2$-$C_8$ fluoro- and/or perfluoroolefins, such as tetrafluoroethylene (TFE), hexafluoropropene (HFP), pentafluoropropylene, and hexafluoroisobutylene;
  $C_2$-$C_8$ hydrogenated monofluoroolefins, such as vinyl fluoride; 1,2-difluoroethylene, vinylidene fluoride (VDF) and trifluoroethylene (TrFE);
  (per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
  chloro- and/or bromo- and/or iodo-$C_2$-$C_6$ fluoroolefins, like chlorotrifluoroethylene (CTFE);
  fluoroalkylvinylethers complying with formula $CF_2=CFOR_{f1}$ in which $R_{f1}$ is a $C_1$-$O6$ fluoro- or perfluoroalkyl, e.g. $-CF_3$, $-C_2F_5$, $-C_3F_7$;
  hydrofluoroalkylvinylethers complying with formula $CH_2=CFOR_{f1}$ in which $R_{f1}$ is a $C_1$-$C_6$ fluoro- or perfluoroalkyl, e.g. $-CF_3$, $-C_2F_5$, $-C_3F_7$;
  fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
  fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;
  functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;
  fluorodioxoles, of formula:

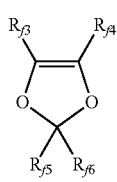

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:

(1) VDF-based copolymers, in which VDF is copolymerized with at least one comonomer chosen from the followings classes:

(a) $C_2$-$C_8$ perfluoroolefins, such as tetrafluoroethylene (TFE), hexafluoropropylene (HFP), hexafluoroisobutylene;

(b) hydrogen-containing $C_2$-$C_8$ olefins, such as vinyl fluoride (VF), trifluoroethylene (TrFE), perfluoroalkyl ethylenes of formula $CH_2=CH-R_f$, wherein $R_f$ is a $C_1$-$C_6$ perfluoroalkyl group;

(c) $C_2$-$C_8$, chloro and/or bromo and/or iodo-fluoroolefins such as chlorotrifluoroethylene (CTFE);

(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

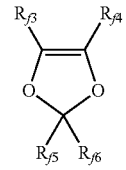

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;

(g) (per)fluoro-methoxy-vinylethers (MOVE, hereinafter) having formula: $CFX_2=CX_2OCF_2OR''_f$ wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2=F, H$; preferably $X_2$ is F and $R''_f$ is $-CF_2CF_3$ (MOVE1); $-CF_2CF_2OCF_3$ (MOVE2); or $-CF_3$ (MOVE3);

(h) $C_2$-$C_8$ non-fluorinated olefins (Ol), for example ethylene and propylene; and (2) TFE-based copolymers, in which TFE is copolymerized with at least one comonomer chosen from classes (c), (d), (e), (g), (h) as above detailed and the followings:

(i) perfluorovinyl ethers containing cyanide groups, such as notably those described in patents U.S. Pat. Nos. 4,281,092, 5,447,993 and 5,789,489.

Most preferred fluoroelastomers (A) are those having following compositions (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;

(ii) vinylidene fluoride (VDF) 50-80%, perfluoroalkyl vinyl ethers (PAVE) 5-50%, tetrafluoroethylene (TFE) 0-20%;

(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%;

(iv) tetrafluoroethylene (TFE) 50-80%, perfluoroalkyl vinyl ethers (PAVE) 20-50%;

(v) tetrafluoroethylene (TFE) 45-65%, $C_2$-$C_8$ non-fluorinated olefins (Ol) 20-55%, vinylidene fluoride 0-30%;

(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%;

(ix) tetrafluoroethylene (TFE) 20-70%, fluorovinyl ethers (MOVE) 30-80%, perfluoroalkyl vinyl ethers (PAVE) 0-50%.

Optionally, fluoroelastomer (A) of the present invention also comprises recurring units derived from a bis-olefin [bis-olefin (OF)] having general formula:

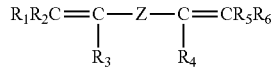

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) Jul. 5, 1995.

The bis-olefin (OF) is preferably selected from the group consisting of those complying with formulae (OF-1), (OF-2) and (OF-3):

(OF-1)

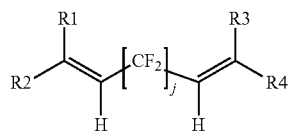

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

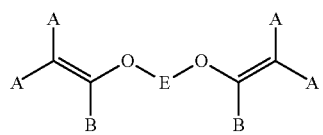

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF$—O—$(CF_2)_5$—O—$CF=CF_2$.

(OF-3)

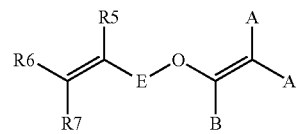

wherein E, A and B have the same meaning as above defined; R5, R6, R7, equal or different from each other, are H, F or $C_{1-5}$ alkyl or (per)fluoroalkyl group.

The fluoroelastomer (A) can be prepared by any known method, such as emulsion or micro-emulsion polymerization, suspension or micro-suspension polymerization, bulk polymerization and solution polymerization.

Optionally the (per)fluoroelastomer composition of the invention may comprise other conventional additives, such as fillers, thickeners, pigments, antioxidants, stabilizers, processing aids, and the like.

The (per)fluoropolyoxyalkylene segment (chain $R_f$) of polymer (E) is preferably a chain comprising recurring units ($R_1$), said recurring units having general formula: —$(CF_2)_k$—CFZ—O—, wherein k is an integer of from 0 to 3 and Z is selected between a fluorine atom and a $C_1$-$C_6$ perfluoro(oxy)alkyl group.

Chain $R_f$ of the polymer (E) more preferably complies with formula:

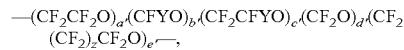

the recurring units being statistically distributed along the (per)fluoropolyoxyalkylene chain, wherein:
Y is a $C_1$-$C_5$ perfluoro(oxy)alkyl group;
z is 1 or 2;
a', b', c', d', e' are integers ≥0.

Most preferably, chain $R_f$ complies with formula:

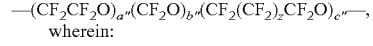
wherein:

z is 1 or 2;
a", b", c" are integers 0.

The polyalkylene segment (chain $R_a$) of polymer (E) preferably complies with formula:

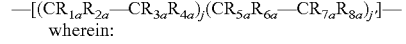
wherein:

j is an integer from 1 to 100, j' is an integer from 0 to 100 with the proviso that (j+j') is higher than 2 and lower than 100; $R_{1a}$, $R_{2a}$, $R_{3a}$, $R_{4a}$, $R_{5a}$, $R_{6a}$, $R_{7a}$, $R_{8a}$, equal to, or different from each other, are selected from the group consisting of H, halogens (preferably F, Cl); $C_1$-$C_6$ (hydro)carbon groups, optionally containing fluorine or other heteroatoms, preferably perfluoroalkyl or (per)fluorooxyalkyl.

Polymer (E) can notably additionally comprise other backbone moieties different from chain $R_f$ and chain $R_a$, as above detailed.

Among those moieties mention can be made of bridging groups, blocks of recurring units different from chain $R_f$ and chain $R_a$ and the like.

Polymer (E) can notably comprise at least one per(halo)fluorinated non-aromatic cyclic moiety having chemically bound to at least two sp³ hybridized carbon atoms chains ($R_f$) as above described, and, having optionally, conjugated or non conjugated double bond(s).

According to a first embodiment of the invention, polymer (E) typically complies with formula:

(formula I)

wherein:
A=—$(X)_a$—O-A'-$(X')_b$—, wherein A' is a chain $R_f$, as above detailed; X, X', equal to or different from each other, are selected from —$CF_2$—, —$CF_2CF_2$—, —CF($CF_3$)—; a, b, equal to or different from each other, are integers equal to 0 or 1, with the proviso that the block A linked to the end group $T_f$-O— has a=1 and the block A linked to the end group $T'_f$ has b=0;

B is a segment of recurring units derived from one or more olefins having formula:

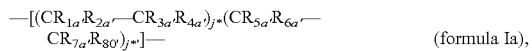
(formula Ia), wherein: j* is an integer from 1 to 100, j*' is an integer from 0 to 100 with the proviso that (j*+j*') is higher than 2 and lower than 100; $R_{1a'}$, $R_{2a'}$, $R_{3a'}$, $R_{4a'}$, $R_{5a'}$, $R_{6a'}$, $R_{7a'}$, $R_{8a'}$, equal to or different from each other, are selected from halogen (preferably F, Cl); H; $C_1$-$C_6$ groups, optionally containing F or other heteroatoms, preferably perfluoroalkyl or (per)fluorooxyalkyl, said substituents $R_{1a'}$-$R_{8a'}$ optionally containing one or more functional groups;

zE is an integer higher than or equal to 1; zE' is 0; zE, zE' are generally such that the number average molecular weight of the polymer (E) of formula (I) is in the range 500-500,000;

B' is a segment otherwise complying with formula (Ia), but having at least one of the substituents $R_{1a'}$ to $R_{8a'}$ different than those in block B;

$T_I$ and $T'_I$, equal to or different from each other, are selected from H, halogen, $C_{1-3}$ (per)fluoroalkyls, $C_{1-6}$ alkyls and $C_1$-$C_{30}$ functional end groups comprising heteroatoms chosen among O, S, N.

Said products can be produced by reacting (per)fluoropolyethers comprising peroxide groups with (fluoro)olefins, as detailed in patent application WO 2008/065163 (SOLVAY SOLEXIS S.P.A.) Jun. 5, 2008 and WO 2008/065165 (SOLVAY SOLEXIS S.P.A.) Jun. 5, 2008.

Preferably, $T_I$ and $T'_I$, equal to or different from each other, are selected from the group consisting of:

(j) —Y', wherein Y' is chain end chosen among —H, halogen, such as —F, —Cl, $C_1$-$C_3$ perhalogenated alkyl group, such as —$CF_3$, —$C_2F_5$, —$CF_2Cl$, —$CF_2CF_2$ Cl;

(jj) -$E_r$-$A_q$-$Y''_k$, wherein k, r and q are integers, with q=0 or 1, r=0 or 1, and k between 1 and 4, preferably between 1 and 2, E denotes a functional linking group comprising at least one heteroatom chosen among O, S, N; A denotes a $C_1$-$C_{20}$ bivalent linking group; and Y" denotes a functional end-group.

The functional group E may comprise an amide, ester, carboxylic, thiocarboxylic, ether, heteroaromatic, sulfide, amine, and/or imine group.

Non (imitative examples of functional linking groups E are notably —CONR—(R=H, $C_1$-$C_{15}$ substituted or unsubstituted linear or cyclic aliphatic group, $C_1$-$C_{15}$ substituted or unsubstituted aromatic group); —COO—; —COS—; —CO—; an heteroatom such as —O—; —S—; —NR'— (R=H, $C_1$-$C_{15}$ substituted or unsubstituted linear or cyclic aliphatic group, $C_1$-$C_{15}$ substituted or unsubstituted aromatic group); a 5- or 6-membered aromatic heterocycle containing one or more heteroatoms chosen among N, O, S, the same or different each other, in particular triazines, such as

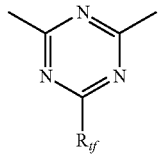

with $R_{tf}$ being a perfluoroalkyl group, e.g. —$CF_3$.

The bivalent $C_1$-$C_{20}$ linking group A is preferably selected from the following classes:

1. linear substituted or unsubstituted $C_1$-$C_{20}$ alkylenic chain, optionally containing heteroatoms in the alkylenic chain; preferably linear aliphatic group comprising moieties of formula —$(CH_2)_m$—, with m integer between 1 and 20, and optionally comprising amide, ester, ether, sulfide, imine groups and mixtures thereof;

2. (alkylene)cycloaliphatic $C_1$-$C_{20}$ groups or (alkylen)aromatic $C_1$-$C_{20}$ groups, optionally containing heteroatoms in the alkylenic chain or in the ring, and optionally comprising amide, ester, ether, sulfide, imine groups and mixtures thereof;

3. linear or branched polyalkylenoxy chains, comprising in particular repeating units selected from: —$CH_2CH_2O$—, —$CH_2CH(CH_3)O$—, —$(CH_2)_3$ O—, —$(CH_2)_4O$—, optionally comprising amide, ester, ether, sulfide, imine groups and mixtures thereof.

Examples of suitable functional groups Y" are notably —OH, —SH, —OR', —SR', —$NH_2$, —NHR', —$NR'_2$, —COOH, —$SiR'_dQ_{3-d}$, —CN, —NCO, epoxy group —($C_2H_3O$—), 1,2- and 1,3-diols as such or as cyclic acetals and ketals (e.g., dioxolanes or dioxanes), —COR', —CH($OCH_3$)$_2$, —CH(OH)$CH_2OH$, —CH(COOH)$_2$, —CH(COOR')$_2$, —CH($CH_2OH$)$_2$, —CH($CH_2NH_2$)$_2$, —PO(OH)$_2$, —CH(CN)$_2$, wherein R' is an alkyl, cycloaliphatic or aromatic substituted or unsubstituted group, optionally comprising one or more fluorine atoms, Q is OR', R' having the same meaning as above defined, d is an integer between 0 and 3.

One or more functional end-groups Y" can be linked to the group A and/or E: for instance, when A is an (alkylen)aromatic $C_1$-$C_{20}$ group, it is possible that two or more Y" groups are linked to the aromatic ring of the group A.

More preferably, the polymer (E) complies with formula (I) here above, wherein $T_I$ and $T'_I$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$; —CH 2OH; —$CH_2(OCH_2CH_2)_nOH$ (n being an integer between 1 and 3); —C(O)OH; —C(O)$OCH_3$; —CONH—$R_H$-OSi($OC_2H_5$)$_3$ (where $R_H$ is a $C_1$-$C_{10}$ alkyl group); —$CONHC_{18}H_{37}$; —$CH_2OCH_2CH(OH)CH_2OH$; —$CH_2O(CH_2CH_2O)_{n*}PO(OH)_2$ (with n* between 1 and 3); and mixtures thereof.

In formula I here above, block B derives from one or more olefins polymerizable by radical route; among those olefins mention can be made of tetrafluoethylene (TFE), ethylene (E), vinylidene fluoride (VDF), chlorotrifluoroethylene (CTFE), hexafluoropropylene (HFP), (per)fluoroalkylvinylethers, (per)fluoroalkoxyalkylvinylethers.

Similarly, block B' derives from one or more olefins polymerizable by radical route, at least one of which is different from olefin(s) of block B. Olefins as above indicated for block B are suitable for being used for block B'.

It is generally preferred that block B and B' (when this latter is present) comprise recurring units derived from perfluorinated olefins.

According to a variant of this first embodiment of the invention a polymer (E) complying with formula (I) here above, wherein zE' is zero, j'* is zero and each of $R_{1a'}$, $R_{2a'}$, $R_{3a'}$, $R_{4a'}$ are fluorine atoms, that is to say, wherein block B is derived from tetrafluoethylene and block B' is absent, is used.

Thus, polymer (E) according to this preferred variant complies with formula:

$T_f\text{-O-}[A\text{-}B]_{zE+}\text{-}A\text{-}T_f'$  (formula II)

wherein:

$A=-(X)_a-O\text{-}A'\text{-}(X')_b-$, wherein X, a and b have the meanings above defined and A' is a chain $R_f$ of formula:

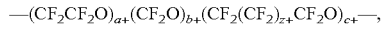
$-(CF_2CF_2O)_{a+}(CF_2O)_{b+}(CF_2(CF_2)_{z+}CF_2O)_{c+}-$, wherein: $z^+$ is 1 or 2; a+, b+, c+ are integers ≥0;

B is a segment of formula $-[(CF_2-CF_2)_{j+}]-$ wherein: j+ is an integer from 2 to 100;

zE+ is an integer ≥1;

$T_l$ and $T_l'$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$.

According to another variant of this first embodiment of the invention a polymer (E) complying with formula (I) here above, wherein zE' is zero, j*' is >0 and each of $R_{1a'}$, $R_{2a'}$, $R_{3a'}$, $R_{4a'}$, $R_{5a'}$, $R_{6a'}$, $R_{7a'}$ are fluorine atoms and $R_{8a'}$ is a perfluoromethyl group, that is to say, wherein block B is derived from a monomer mixture made of tetrafluoethylene and hexafluoropropylene, and block B' is absent, is used.

Thus, polymer (E) according to this variant complies with formula:

$T_f\text{-O}-[A\text{-}B]_{zE0}\text{-}A\text{-}T_f'$  (formula III)

wherein:

$A=-(X)_a-O\text{-}A'\text{-}(X')_b-$, wherein X, a and b have the meanings above defined and A' is a chain $R_f$ of formula:

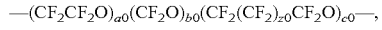
$-(CF_2CF_2O)_{a0}(CF_2O)_{b0}(CF_2(CF_2)_{z0}CF_2O)_{c0}-$, wherein: $z^0$ is 1 or 2; a0, b0, c0 are integers 0;

B is a segment of formula $-[(CF_2-CF_2)_{j^*}(CF_2CF(CF_3))_{j^{**}}]-$, wherein units of formula $-CF_2-CF_2-$ and $-CF_2CF(CF_3)-$ are statistically distributed in segment B, wherein: j* and j** are both integers >0, such that j*+j** is from 2 to 100;

zE0 is an integer ≥1;

$T_l$ and $T_l'$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$.

According to a second embodiment of the invention, polymer (E) comprises at least one per(halo)fluorinated non-aromatic cyclic moiety having chemically bound to at least two sp³ hybridized carbon atoms chains ($R_f$) as above described, and, having optionally, conjugated or non conjugated double bond(s).

The Applicant thinks, without this limiting the scope of the invention, that the presence of such per(halo)fluorinated non-aromatic cyclic moiety wherein at least two sp³ hybridized carbon atoms are chemically bound to chains ($R_f$) as above described is particularly advantageous as these moieties can advantageously take part in the curing process which the fluoroelastomer (A) will undergoes, thus enabling creation of an interpenetrated network of cured fluoroelastomer and additive.

The polymer (E) according to this embodiment preferably complies with formula (IV):

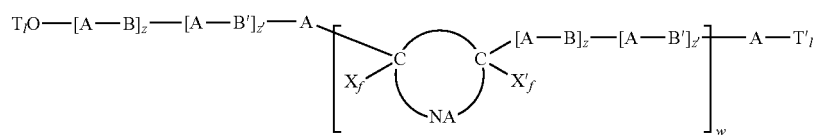
(formula IV)

wherein:

$X_f$ and $X'_f$, equal or different from each other are chosen among halogen, and $C_1$-$C_{12}$ per(halo)fluorocarbon substituents, preferably among —F and $C_1$-$C12$ perfluoroalkyl or perfluoroaryl groups;

NA represents a per(halo)fluorinated non-aromatic cyclic moiety [moiety (NA)] optionally condensed with additional aromatic or non aromatic moieties, optionally having one or more conjugated or non conjugated double bond(s), optionally having one or more per(halo)fluorosubstituents and wherein said cyclic moiety comprises the two sp³ hybridized carbon bearing $T_f$-O-$[A\text{-}B]_z$-$[A\text{-}B]_z$-$A$- and -$[A\text{-}B]_z$-$[A\text{-}B']_{z'}$-$A$-$T_l'$ substituents;

w is an integer from 1 to 10;

$A=-(X)_a-O\text{-}A'-(X')_b-$, wherein A' is a chain $R_f$, as above detailed; X, X', equal to or different from each other, are selected from —$CF_2$—, —$CF_2CF_2$—, —CF($CF_3$)—; a, b, equal to or different from each other, are integers equal to 0 or 1, with the proviso that the block A linked to the end group $T_f$—O— has a=1 and the block A linked to the end group $T'_l$ has b=0;

B is a segment of recurring units derived from one or more olefins having formula:

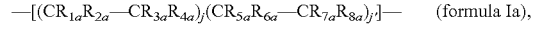
$-[(CR_{1a}R_{2a}-CR_{3a}R_{4a})_j(CR_{5a}R_{6a}-CR_{7a}R_{8a})_{j'}]-$ (formula Ia), wherein: j is an integer from 1 to 100, j' is an integer from 0 to 100 with the proviso that (j+j') is higher than 2 and lower than 100; $R_{1a}$, $R_{2a}$, $R_{3a}$, $R_{4a}$, $R_{5a}$, $R_{6a}$, $R_{7a}$, $R_{8a}$, equal to or different from each other, are selected from halogen (preferably F, Cl); H; $C_1$-$C_6$ groups, optionally containing F or other heteroatoms, preferably perfluoroalkyl or (per)fluorooxyalkyl, said substituents $R_{1a}$-$R_{8a}$ optionally containing one or more functional groups;

z is an integer higher than or equal to 1; z' is ≥0; z, z' are such that the number average molecular weight of the polymer (E) is in the range 500-500,000;

B' is a segment otherwise complying with formula (Ia), but having at least one of the substituents $R_{1a}$ to $R_{8a}$ different than those in block B;

$T_l$ and $T_l'$, equal to or different from each other, are selected from H, halogen, $C_{1-3}$ (per)fluoroalkyls, $C_{1-6}$ alkyls and $C_1$-$C_{30}$ functional end groups comprising heteroatoms chosen among O, S, N.

The polymer (E) according to this embodiment typically comprises at least one of units selected from those of formulae:

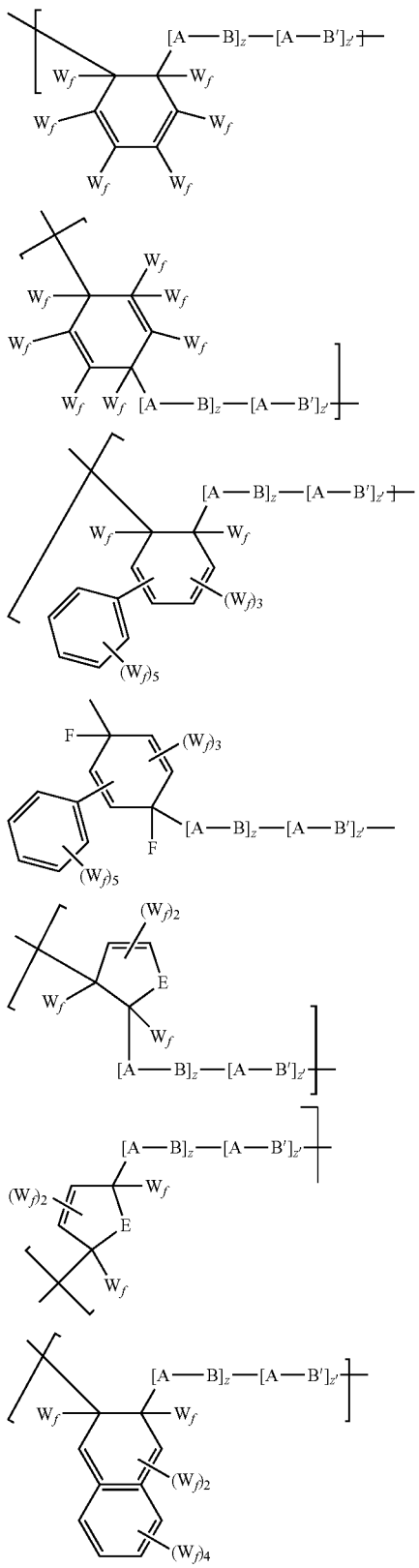

-continued

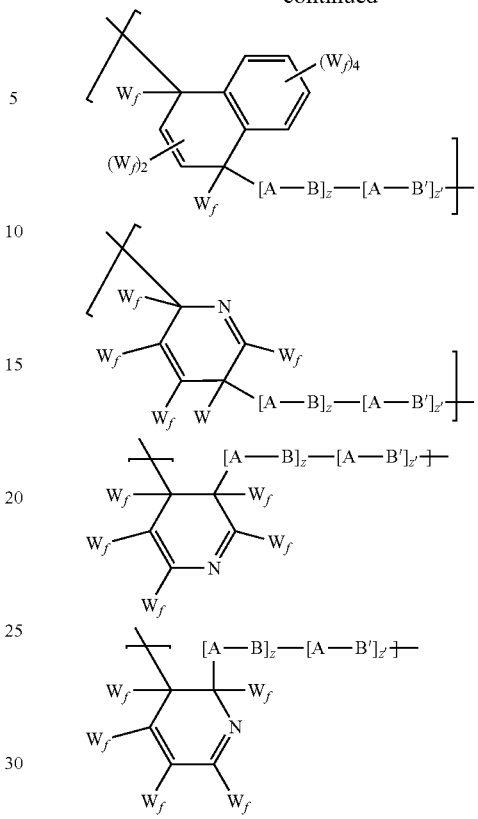

wherein A, B, B', z and z' have the meaning as above detailed and $W_f$ is a fluorine atom or a $C_1$-$C_6$ perfluorocarbon group.

Said products can be produced by step-wise reacting (per)fluoropolyethers comprising peroxide groups with (fluoro)olefins, as detailed in patent application WO 2008/065163 (SOLVAY SOLEXIS S.P.A.) 5 Jun. 2008 and WO 2008/065165 (SOLVAY SOLEXIS S.P.A.) 5 Jun. 2008, followed by reaction of mixture obtained therefrom with perfluoroaromatic compounds, as taught in WO 2009/112577 (SOLVAY SOLEXIS SPA [IT]) 17 Sep. 2009.

The invention also pertains to the use of the (per)fluoroelastomer composition as above described for fabricating shaped articles.

The (per)fluoroelastomer composition can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer composition into a finished article made of non-tacky, strong, insoluble, chemically and thermally resistant cured fluoroelastomer composition.

The invention finally pertains to cured articles obtained from the (per)fluoroelastomer compositions of the invention. Articles are notably obtained by means of ionic curing, peroxide curing and/or mixed curing from the (per)fluoroelastomer compositions of the invention.

As manufactured articles, O-rings, gaskets, pipes, fittings, shaft seals and oil seal rings can be mentioned.

When the (per)fluoroelastomer compositions of the present invention are cured by peroxide route, fluoroelastomer (A)

preferably contains iodine and/or bromine atoms in the chain and/or at the end of the macromolecules. The introduction of these iodine and/or bromine atoms may be obtained:

by addition during fluoroelastomer (A) manufacture to the polymerization medium of brominated and/or iodinated cure-site comonomers, such as bromo and/or iodo olefins containing from 2 to 10 carbon atoms (as described, for example, in U.S. Pat. No. 4,0355,65 (DU PONT) 12 Jul. 1977 and U.S. Pat. No. 4,694,045 (DU PONT) 15 Sep. 1987), or iodo and/or bromo fluoroalkyl vinyl ethers (as notably described in patents U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986), in amounts such that the content of cure-site comonomers in the fluoroelastomer (A) is generally between 0.05 and 2 mol per 100 mol of the other base monomer units; or via addition during fluoroelastomer (A) manufacture of iodinated and/or brominated chain-transfer agent(s) to the polymerization medium, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, patents U.S. Pat. No. 4,243,770 (DAIKIN IND LTD) Jan. 6, 1981 and U.S. Pat. No. 4,943,622 (NIPPON MEKTRON KK) 24 Jul. 1990) or alkali metal or alkaline-earth metal iodides and/or bromides, as described in patent U.S. Pat. No. 5,173,553 (AUSIMONT SRL) 22 Dec. 1992.

The peroxide curing is typically performed according to known techniques via addition of suitable peroxide that is capable of generating radicals by thermal decomposition. Among most commonly used agents, mention can be made of: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl] carbonate. Other suitable peroxide systems are those described, notably, in patent applications EP 136596 A (MONTEDISON SPA) 10 Apr. 1985 and EP 410351 A (AUSIMONT SRL) 30 Jan. 1991, whose content is hereby incorporated by reference.

Other ingredients generally added to the curable compound comprising the compositions of the invention, when curing via peroxidic route, are: (a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) 26 Aug. 1998 and WO 97/05122 (DU PONT [US]) 13 Feb. 1997; among above mentioned curing coagents, bis-olefins (OF), as above detailed, and more specifically those of formula (OF-1), as above detailed, have been found to provide particularly good results;

(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc., as described in EP 708797 A (DU PONT) 1 May 1996;

(d) optionally, other conventional additives, such as fillers, thickeners, pigmen-ts, antioxidants, stabilizers, processing aids, and the like.

When the fluoroelastomer (A) comprises recurring units comprising cyanide groups, the curing of the compositions thereof can be also performed using organotin compounds or biaromatic amine compounds as crosslinking agents, as notably described in U.S. Pat. No. 5,767,204 (NIPPON MEKTRON KK) 16 Jun. 1998 and U.S. Pat. No. 5,789,509 (DU PONT) 4 Aug. 1998. This type of curing may be combined with peroxide-type curing, when the fluoroelastomer (A) also comprises iodine or bromine atoms, preferably in terminal positions, as described in U.S. Pat. No. 5,447,993 (DU PONT) 5 Sep. 1995.

The ionic curing can be performed via addition of one or more curing agent and one or more accelerator, as well known in the art. The amounts of accelerator(s) are generally comprised between 0.05 and 5 phr and that of the curing agent typically between 0.5 and 15 phr and preferably between 1 and 6 phr.

Aromatic or aliphatic polyhydroxylated compounds, or derivatives thereof, may be used as curing agents; examples thereof are described, notably, in EP 335705 A (MINNESOTA MINING & MFG) 4 Oct. 1989. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A (MINNESOTA MINING & MFG) 4 Oct. 1989 and U.S. Pat. No. 3,876,654 (DU PONT) 8 Apr. 1975); aminophosphonium salts (see, notably, U.S. Pat. No. 4,259,463 (MONTEDISON SPA) 31 Mar. 1981); phosphoranes (such as notably those described in U.S. Pat. No. 3,752,787 (DU PONT) 14 Aug. 1973); imine compounds of formula:

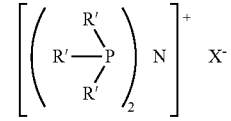

with R' being a hydrocarbon group (e.g. substituted or unsubstituted aryl group; substituted or unsubstituted alkyl group), such as notably those described in EP 182299 A (ASAHI CHEMICAL IND) 28 May 1986 and EP 120462 A (MONTEDISON SPA) 3 Oct. 1984; etc. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethylphosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in EP 684277 A (AUSIMONT SPA) 29 Nov. 1995which is included herein in its entirety by reference.

Other ingredients generally added to the curable compound comprising the compositions of the invention, when curing via ionic route are:

i) one or more mineral acid acceptors chosen from those known in the ionic curing of vinylidene fluoride copolymers, typically comprised in amounts of 1-40 parts per 100 parts of fluoroelastomer;

ii) one or more basic compounds chosen from those known in the ionic curing of vinylidene fluoride copolymers, typically added in amounts of from 0.5 to 10 parts per 100 parts of fluoroelastomer.

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A).

Also, other conventional additives, such as fillers, thickeners, pigments, antioxidants, stabilizers and the like, may then be added to the curing mixture.

The (per)fluoroelastomer composition of the present invention may also be cured via a mixed route combining the two types of curing.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

Raw materials

TECNOFLON® PFR 94 TFE/MVE copolymer has been used in examples 1-3C and TECNOFLON® PFR 95HT TFE/MVE copolymer has been used in examples 4 and 5C, both commercially available from Solvay Solexis S.p.A.

PREPARATIVE EXAMPLE 1

Preparation of Additive from Perfluoropolyether Peroxide, Tetrafluoroethylene and Hexafluorobenzene In a 1 liter glass flask, equipped with probe for the temperature, mechanical stirring, bubbling inlet for the adduction of nitrogen and/or tetrafluoroethylene, 450 g of GALDEN® HT200 PFPE, and 150 g of a peroxidic perfluoropolyether of formula: $X_o$—$O(CF_2CF_2O)_r(CF_2O)_s(O)_t$—$X_o'$ wherein: $X_o$ and $X_o'$ are: —$CF_3$ (33%), —$CF_2Cl$ (15%), —$CF_2CF_2Cl$ (20%), —COF (20%), —$CF_2COF$ (12%); r/s=1.25 and t/(r+s)=0.077 and having a PO equal to 1.3 [defined as g of active oxygen/100 g of perfluoropolyether peroxide], and having a $M_n$=4,0×10⁴ were introduced.

The reaction mixture was heated under stirring and under nitrogen flow (1 Nl h⁻¹) up to 170° C. temperature at which the nitrogen feed is stopped and the feed of tetrafluoroethylene (TFE) starts with a flow-rate equal to 1.8 Nl l⁻¹. The mixture was maintained under stirring at 170° C. for 3.5 hours; the TFE feeding was discontinued and nitrogen was fed (1 Nl h⁻¹) letting the temperature cooling down to 150° C. By distillation under vacuum at 10⁻² mbar, the solvent was removed, yielding 156 g of product having a PO=1.1. In a stainless steel reactor having an inner volume of 1000 ml, a solution comprising 700 g of hexafluorobenzene and 70 g of the above obtained peroxidic PFPE was charged. After three cycles of freeze-thawing under nitrogen, the autoclave was heated at 240° C. for 3 hours. The autoclave was then cooled to room temperature and overpressure (3 bar) of carbonyl fluoride was vented. Unreacted hexafluorobenzene was separated by fractional distillation, first at atmospheric pressure, then under vacuum (P=10⁻¹ mbar, T max=200° C.) until recovery of 681 gr. Oily distillation residue (71 g) was characterized by NMR spectroscopy and was found to comply to the following structure:

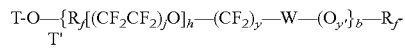

wherein

W are divalent perfluoro-1,3-cyclohexadienic units and perfluoro-1,4-cyclohexadienic units of formula —$C_6F_6$—;

y, y'=0 or 1;

$R_f$ are perfluoropolyether blocks of formula: —$(CF_2CF_2O)_m(CF_2O)_n(CF_2\quad CF_2CF_2O)_p(CF_2CF_2CF_2CF_2O)_q$—, with m/n=1.2, p/n=0.007, q/n=0.005, h/n=0.011;

h=0 or 1 or 2 with the provision that, in the whole chain, h/b=0.08;

j=12; b=20; $M_n$=4,2×10⁴;

T and T' are: —$CF_3$ (34%), —$CF_2Cl$ (14%), —$CF_2CF_2Cl$ (22%), —$CF_2COF$ (30%).

The presence of cyclohexadienic structure was confirmed by IR analysis which evidenced absorption peaks centred at 1768, 1733 and 1706 cm⁻¹, which are related to stretching modes of C=C double bond. The obtained product was subjected to esterification of the terminal acyl fluoride endgroups. In a glass reactor having inner volume of 125 ml, 60 g of above mentioned oily residue was combined with 60 g of isobutanol. The so-obtained mixture was heated at reflux for 4 hours. Then, the reaction mixture was submitted to fractionation, first at atmospheric pressure, then under vacuum (10⁻¹ mbar) until complete elimination of unreacted isobutanol. IR analysis of the vacuum residue (60 g) evidenced the quantitative conversion of acyl fluoride end-groups (having absorption band at 1784 cm⁻¹) into ester moieties having absorption band at 1794 cm.

PREPARATIVE EXAMPLE 2

Preparation of Additive from Perfluoropolyether Peroxide and Mixture of Tetrafluoroethylene and Hexafluoropropylene In a 1 liter glass flask, equipped with probe for the temperature, mechanical stirring, bubbling inlet, 475 g of GALDEN® HT200 PFPE, and 150 g of a peroxidic perfluoropolyether of formula: $X_o$—$O(CF_2CF_2O)_r(CF_2O)_s(O_t$—$X_o'$ wherein: $X_o$ and $X_o'$ are: —$CF_3$ (29%), —$CF_2Cl$ (13%), —$CF_2CF_2Cl$ (20%), —COF (24%), —$CF_2COF$ (14%); r/s=1.25 and t/(r+s)=0.077 and having a PO equal to 1.3, and having a Mn=3.6×10⁴ were introduced.

The reaction was heated under stirring and nitrogen flow (1 Nlh⁻¹) until reaching temperature of 190° C., wherein nitrogen feed was interrupted and a mixture of tetrafluoroethylene (TFE) and hexafluoropropylene (HFP) (TFE/HFP=3.8 mol/mol) was resumed at a flow rate of 2.8 Nlh⁻¹. The mixture was maintained under stirring at 190° C. for 1.5 hours, then heated to and maintained at 200° C. for 1.5 hours, and, lastly, heated and maintained at 210° C. for 1 hour.

Monomers feeding was interrupted, nitrogen feed resumed (1 Nlh⁻¹) and temperature raised to 230° C. for 3 hours.

After this thermal treatment, mixture was cooled down to room temperature; solvent was then removed by distillation under vacuum yielding a product of formula (as characterized by ¹⁹F-NMR):

T-O-[A-B]$_z$-A-T' wherein T and T' are —$CF_3$ (29%), —$CF_2COF$ (45%); and —$CF_2Cl$ and —$CF_2$ $CF_2Cl$ for the reminders, B is a perfluorocarbon block of formula —$[(CF_2CF_2)_j (CF_2CF(CF_3))_{j'}]$ wherein the sum j+j' has a number averaged value of 9.25, corresponding to an averaged length of segment B of 19.5, and a j/j' ratio of about 0.045; A is a group of formula: —$(CF_2)O$—$[(CF_2O)_n(CF_2CF_2O)_m(CF_2CF_2CF_2O)_p(CF_2CF_2CF_2CF_2O)_q](CF_2)_b$— with values of m/n=1.08; p/n=0.014; q/n=0.020; (p+q)/(p+q+n+m)=0.016, with b=0 when A is linked to T' and b=1 in all other cases.

The weight percent of the fluorocarbon segment B is equal to 23.8%. The averaged molecular weight of the polymer was found to be 3.0×10⁴, from which an average value of equal to 7 can be determined. DSC analysis gave a $T_g$ value of −112° C. and a melting peak of about 115° C.

Mechanical and Sealing Property Determination on Cured Samples

Perfluoroelastomer was pre-compounded with the additives of example 1 or 2 using a Brabender mixer; this blend was then compounded with the other ingredients as listed in the tables. Plaques and O-rings (size class=214) have been cured in a pressed mould and then post-treated in an air circulating oven in conditions (time, temperature) specified in the Examples.

The tensile properties have been determined on specimens punched out from the plaques, according to the DIN 53504 Standard.

M 100 is the tensile strength in MPa at an elongation of 100%

T.S. is the tensile strength in MPa;

E.B. is the elongation at break in %.

The Shore A hardness (3") (HDS) has been determined on 3 pieces of plaque piled according to the ASTM D 2240 method.

The compression set (C-SET) has been determined on O-ring (class: 214) or on 6 mm buttons, according to the ASTM D 395 method.

Cure behaviour was determined according to ASTM D-6601, at a temperature of 160° C., by determining the following properties:

$M_L$=Minimum torque (lb*in)
$M_H$=Maximum torque (lb*in)
$t_{S2}$=Time for two units rise from $M_L$ (sec);
$t'_{50}$=Time to 50% state of cure (sec);
$t'_{90}$=Time to 90% state of cure (sec)

Stiction properties were evaluated according to a test method comprising:

bringing specimens between two sheets of Aluminium (thickness=0.1 mm) at 23° C. at a compression value of 25%;

maintaining said compression value for 24 hours at 200° C.;

cooling, still under compression, for 1 h at 23° C.;

releasing compression and determining maximum adhesion force by peel test)(180°). Lower values of maximum adhesion force are representative of specimens having improved stiction behaviour (i.e. having a 'non-stick' behaviour towards hard substrates, even after prolonged compression at high T).

TABLE 1

| Run | | 1 | 2 | 3C |
|---|---|---|---|---|
| Polymer - Compound | | | | |
| PFR 94 | Wt | 100 | 100 | 100 |
| Additive Ex. 1 | parts | 10 | — | — |
| Additive Ex. 2 | | — | 10 | — |
| Other ingredients | | | | |
| TAIC(*) | Wt | 4 | 4 | 4 |
| Luperox(**) | parts | 1.5 | 1.5 | 1.5 |
| N990(***) | | 15 | 15 | 15 |
| ZnO | | 5 | 5 | 5 |
| CR - Mooney Test | | | | |
| | | MDR 12 min @ 160 C. | | |
| ML | lb*in | 0.5 | 0.5 | 0.6 |
| MH | lb*in | 28.2 | 27.5 | 34.4 |
| ts2 | sec | 39 | 36 | 38 |
| t_50 | sec | 69 | 61 | 71 |
| t_90 | sec | 186 | 140 | 166 |
| Mechanical Properties | | | | |
| Press cure | | 10 min @ 160 C. | | |
| Post cure | | 4 h @ 230 C. | | |
| Method | | DIN 53504 S2 | | |
| T.S. | MPa | 15.7 | 17.0 | 21.2 |
| M 100 | MPa | 8.0 | 7.8 | 11.6 |
| E.B. | % | 159 | 176 | 156 |
| HDS | pts | 78 | 78 | 79 |
| Press cure | | 10 min @ 160 C. | | |
| Post cure | | 4 h @ 230 C. | | |
| DSC analysis | | | | |
| $T_g$ (onset) | ° C. | −16° C. | −17° C. | −5° C. |
| $T_g$ (midpoint) | ° C. | −5° C. | −6° C. | +2° C. |
| CSET - Compression set @200° C. | | | | |
| method | | ASTM D395 Method B | | |
| Specimen | | AS568A-214 | | |
| C-SET | % | 14 | 18 | 18 |
| Failures(+) | % | 0 | 0 | 0 |
| CSET - Compression set @250° C. | | | | |
| C-SET Spec | | ASTM D395 Method B | | |
| Specimen | | AS568A-214 | | |
| C-SET | % | 79 | 69 | 70 |
| Failures(+) | % | 0 | 0 | 63 |
| CSET - Compression set @250° C. | | | | |
| C-SET Spec | | ASTM D395 Method B | | |
| Specimen | | BUTTONS-6 mm | | |
| C-SET | % | 48 | 25 | 22 |
| Failures(+) | % | 0 | 0 | 63 |

(*)TAIC: Drimix ® TAIC 75: silica supported triallylisocyanurate;
(**)Luperox 101 XL 45 supported peroxide (2,5-bis(tert-butylperoxy)-2,5-dimethylhexane);
(***)Carbon Black N990 MT;
(+)percentage of specimens broken or otherwise damaged at the end of compression period, for which no sensible determination of C-set can be made.

TABLE 2

| Run | | 4 | 5C |
|---|---|---|---|
| PFR 95HT | Wt | 100 | 100 |
| Additive Ex. 2 | parts | 5 | — |
| Bis-olefin[(o)] | Wt | 1.5 | 1.5 |
| Luperox[(oo)] | parts | 1 | 2 |
| CR - Mooney Test | | | |
| MDR 12 min | | at 170° C. | at 160° C. |
| ML | lb*in | 1.8 | 2.2 |
| MH | lb*in | 12.1 | 12.8 |
| ts2 | sec | 62 | 78 |
| t_50 | sec | 93 | 126 |
| t_90 | sec | 182 | 269 |
| Mechanical properties at 23° C. | | | |
| Specimen | type | ASTM D412C | |
| T.S. | MPa | 16.9 | 17.3 |
| M 100 | MPa | 4.0 | 5.1 |
| E.B. | % | 212 | 193 |
| HDS | pts | 68 | 71 |
| Compression Set at 200° C. | | | |
| Press cure | | 90' at 170° C. | 90' at 160° C. |
| Post cure | | (8 + 16 h) at 230° C. | |
| Method | | ASTM D395 B | |
| Specimen | | AS568A-214 | |
| C-SET | % | 15 | 26 |
| Stiction Properties | | | |
| Maximum adhesion force | N | 10.2 | 36.9 |

[(o)]bis-olefin of formula $CH_2=CH-(CF_2)_6-CH=CH_2$;
[(oo)]Luperox 101 neat peroxide (2,5-bis(tert-butylperoxy)-2,5-dimethylhexane)

The invention claimed is:

1. A (per)fluoroelastomer composition comprising:
at least one (per)fluoroelastomer (A); and
from 0.1 to 30 weight parts, per hundred parts of (per)fluoroelastomer (A), of at least one perfluoropolyether block copolymer (E) comprising:
one or more (per)fluoropolyoxyalkylene segment (chain $R_f$), said (per)fluoropolyoxyalkylene segment comprising recurring units having at least one catenary ether bond and at least one fluorocarbon moiety, and
one or more polyalkylene segment (chain $R_a$) comprising recurring units of formula: —$(CR_{1e}R_{2e}-CR_{3e}R_{4e})$—
wherein $R_{1e}$, $R_{2e}$, $R_{3e}$, $R_{4e}$, equal to or different from each other, are selected from the group consisting of H, halogens, and $C_1-C_6$ (hydro)carbon groups, optionally containing fluorine or other heteroatoms and
wherein copolymer (E) further comprises at least one per(halo)fluorinated non-aromatic cyclic moiety having at least two $sp^3$ hybridized carbon atoms, wherein at least two of the $sp^3$ hybridized carbon atoms of the moiety are chemically bound to at least two chains $R_f$, and wherein the moiety optionally comprises conjugated or non conjugated double bond(s).

2. The (per)fluoroelastomer composition of claim 1, wherein (per)fluoroelastomer (A) comprises recurring units derived from at least one (per)fluorinated monomer selected from the group consisting of:
$C_2-C_8$ fluoro- and/or perfluoroolefins;
$C_2-C_8$ hydrogenated monofluoroolefins;
(per)fluoroalkylethylenes complying with formula $CH=CH-R_{f0}$, wherein $R_{f0}$ is a $C_1-C_6$ (per)fluoroalkyl or a $C_1-C_6$ (per)fluorooxyalkyl having one or more ether groups;
chloro- and/or bromo- and/or iodo-$C_2-C_6$ fluoroolefins;
fluoroalkylvinylethers complying with formula $CF_2=CFOR_{f1}$ wherein $R_{f1}$ is a $C_1-C_6$ fluoro- or perfluoroalkyl;
hydrofluoroalkylvinylethers complying with formula $CH_2=CFOR_{f1}$ wherein $R_{f1}$ is a $C_1-C_6$ fluoro- or perfluoroalkyl;
fluoro-oxyalkylvinylethers complying with formula $CF_2=CFOX_0$, wherein $X_0$ is a $C_1-C_{12}$ oxyalkyl, or a $C_1-C_{12}$ (per)fluorooxyalkyl having one or more ether groups;
fluoroalkyl-methoxy-vinylethers complying with formula $CF_2=CFOCF_2OR_{f2}$ wherein $R_{f2}$ is a $C_1-C_6$ fluoro- or perfluoroalkyl, or a $C_1-C_6$ (per)fluorooxyalkyl having one or more ether groups;
functional fluoro-alkylvinylethers complying with formula $CF_2=CFOY_0$, wherein $Y_0$ is a $C_1-C_{12}$ alkyl or (per)fluoroalkyl, or a $C_1-C_{12}$ oxyalkyl or a $C_1-C_{12}$ (per)fluorooxyalkyl, and wherein $Y_0$ group comprises a carboxylic or sulfonic acid group, in its acid, acid halide or salt form; and
fluorodioxoles, of formula:

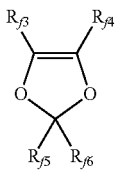

wherein each of $R_{f3}$, $R_{f4}$, $R_{f5}$, $R_{f6}$, equal or different each other, is independently a fluorine atom, a $C_1-C_6$ fluoro- or per(halo)fluoroalkyl, optionally comprising one or more oxygen atom.

3. The (per)fluoroelastomer composition of claim 1, wherein (per)fluoroelastomer (A) is selected from the group consisting of:
(1) VDF-based copolymers, wherein said VDF is copolymerized with at least one comonomer selected from the group consisting of:
(a) $C_2-C_8$ perfluoroolefins;
(b) hydrogen-containing $C_2-C_8$ olefins;
(c) $C_2-C_8$ chloro and/or bromo and/or iodo-fluoroolefins;
(d) (per)fluoroalkylvinylethers (PAVE) of formula $CF_2=CFOR_f$, wherein $R_f$ is a $C_1-C_6$ (per)fluoroalkyl group;
(e) (per)fluoro-oxy-alkylvinylethers of formula $CF_2=CFOX$, wherein X is a $C_1-C_{12}$ ((per)fluoro)-oxyalkyl comprising catenary oxygen atoms;
(f) (per)fluorodioxoles having formula:

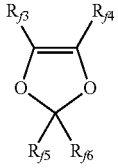

wherein $R_{f3}$, $R_{f4}$, $R_{f5}$, $R_{f6}$, equal or different from each other, are independently selected from the group consisting of fluorine atoms and $C_1-C_6$ (per)fluoroalkyl groups, optionally comprising one or more than one oxygen atom;
(g) (Per)fluoro-methoxy-vinylethers (MOVE) having formula:

$CFX_2=CX_2OCF_2OR"_f$ wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H; and (h) $C_2$-$C_8$ non-fluorinated olefins (Ol); and (2) TFE-based copolymers, wherein TFE is copolymerized with at least one comonomer selected from the group consisting of:

(c) $C_2$-$C_8$ chloro and/or bromo and/or iodo-fluoroolefins;

(d) (per)fluoroalkylvinylethers (PAVE) of formula $CF_2$=$CFOR_f$, wherein $R_f$ is a $C_1$-$C_6$ (per)fluoroalkyl group;

(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms;

(g) (per)fluoro-methoxy-vinylethers (MOVE) having formula:

$$CFX_2=CX_2OCF_2OR''_f$$

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H; and (h) $C_2$-$C_8$ non-fluorinated olefins (Ol); and:

(i) perfluorovinyl ethers containing cyanide groups.

4. The (per)fluoroelastomer composition of claim 1, wherein (per)fluoroelastomer (A) comprises recurring units derived from a bis-olefin (OF) having general formula:

$$R_1R_2C=C(R_3)-Z-C(R_4)=CR_5R_6$$

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, or a (per)fluoropolyoxyalkylene radical.

5. The (per)fluoroelastomer composition of claim 4, wherein said bis-olefin (OF) is selected from the group consisting of those complying with formulae (OF-1), (OF-2) and (OF-3):

(OF-1)

$$R_2(R_1)C=CH-[CF_2]_j-CH=C(R_3)R_4$$

wherein j is an integer between 2 and 10, and R1, R2, R3, R4, equal or different from each other, are H, F or $C_{1-5}$ alkyl or (per)fluoroalkyl group;

(OF-2)

wherein each of A, equal or different from each other and at each occurrence, is independently selected from the group consisting of F, Cl, and H; each of B, equal or different from each other and at each occurrence, is independently selected from the group consisting of F, Cl, H and $OR_B$, wherein said $R_B$ is a branched or straight chain alkyl radical which can be partially, substantially or completely fluorinated or chlorinated; said E is a divalent group having 2 to 10 carbon atom, optionally fluorinated, which may be inserted with ether linkages;

(OF-3)

wherein E, A and B have the same meaning as above defined; R5, R6, R7, equal or different from each other, are H, F or $C_{1-5}$ alkyl or (per)fluoroalkyl group.

6. The (per)fluoraelastomer composition of claim 1, wherein said chain $R_f$ of the copolymer (E) complies with formula:

$$-(CF_2CF_2O)_{a'}(CFYO)_{b'}(CF_2CFYO)_{c'}(CF_2O)_{d'}(CF_2(CF_2)_zCF_2O)_{e'}-,$$

the recurring units being statistically distributed along the (per)fluoropolyoxyalkylene chain, wherein:

Y is a $C_1$-$C_5$ perfluoro(oxy)alkyl group;

z is 1 or 2; and a', b', c', d', e' are integers ≥0.

7. The (per)fluoroelastomer composition of claim 1, wherein copolymer (E) complies with formula (IV):

(formula IV)

$$T_fO-[A-B]_z-[A-B']_{z'}-A-C(X_f)=C(X'_f)-NA-[A-B]_z-[A-B']_{z'}-A-T'_f$$

(with ring structure through NA, repeat unit w)

wherein:

X$_f$ and X'$_f$, equal or different from each other are selected from the group consisting of halogen, and C$_1$-C$_{12}$ per(halo)fluorocarbon substituents;

NA represents a per(halo)fluorinated non-aromatic cyclic moiety [moiety (NA)] optionally condensed with additional aromatic or non aromatic moieties, optionally having one or more conjugated or non conjugated double bond(s), optionally having one or more per(halo)fluorosubstituents and wherein said cyclic moiety comprises the two sp$^3$ hybridized carbon bearing T$_I$-O-[A-B]$_z$-[A-B']$_z$-A- and -[A-B]$_z$-[A-B']$_z$-A-T$_I'$ substituents;

w is an integer from 1 to 10;

A is —(X)$_a$—O-A'-(X')$_b$—, wherein A' is a chain R$_f$ having formula: —(CF$_2$CF$_2$O)$_a$(CFYO)$_b$(CF$_2$CFYO)$_{c'}$ (CF$_2$O)$_{d'}$(CF$_2$(CF$_2$)$_z$CF$_2$O)$_{e'}$—, the recurring units being statistically distributed along the (per)fluoropolyoxyalkylene chain, wherein:

Y is a C$_1$-C$_5$ perfluoro(oxy)alkyl group;

z is 1 or 2;

a', b', c', d', e' are integers ≥0; X, X', equal to or different from each other, are selected from —CF2—, —CF2CF2—, and —CF(CF$_3$)—; a, b, equal to or different from each other, are integers equal to 0 or 1, with the proviso that the block A linked to the end group T$_I$-O— has a=1 and the block A linked to the end group T$_I'$ has b=0;

B is a segment of recurring units derived from one or more olefins having formula:

—[(CR$_{1a}$R$_{2a}$—CR$_{3a}$R$_{4a}$)$_j$(CR$_{5a}$R$_{6a}$—CR$_{7a}$R$_{8a}$)$_{j'}$]—  (formula Ia), wherein: j is an integer from 1 to 100, j' is an integer from 0 to 100 with the proviso that (j+j') is higher than 2 and lower than 100; R$_{1a}$, R$_{2a}$, R$_{3a}$, R$_{4a}$, R$_{5a}$, R$_{6a}$, R$_{7a}$, R$_{8a}$, equal to or different from each other, are selected from the group consisting of halogen; H; and C$_1$-C$_6$ groups, optionally containing F or other heteroatoms said substituents R$_{1a}$-R$_{8a}$ optionally containing one or more functional groups;

z is an integer higher than or equal to 1; z' is ≥0; z, z' are such that the number average molecular weight of copolymer (E) is in the range 500-500,000;

B' is a segment otherwise complying with formula (Ia), having at least one of the substituents R$_{1a}$ to R$_{8a}$ different than those in block B; and T$_I$ and T$_I'$ equal to or different from each other, are selected from the group consisting of H, halogen, C$_{1-3}$, (per)fluoroalkyls, C$_{1-6}$ alkyls and C$_1$-C$_{30}$ functional end groups comprising heteroatoms chosen among O, S, N.

8. A cured article obtained from the (per)fluoroelastomer composition of claim 1.

9. The (per)fluoroelastomer composition of claim 1, wherein R$_{1e}$, R$_{2e}$, R$_{3e}$, R$_{4e}$, equal to or different from each other, are selected from the group consisting of H, F, Cl, perfluoroalkyl or (per)fluorooxyalkyl.

10. The (per)fluoroelastomer composition of claim 1, wherein (per)fluoroelastomer (A) comprises recurring units derived from at least one (per)fluorinated monomer selected from the group consisting of:

tetrafluoroethylene (TFE), hexafluoropropene (HFP), pentafluoropropylene, and hexafluoroisobutylene;

vinyl fluoride, 1,2-difluoroethylene, vinylidene fluoride (VDF) and trifluoroethylene (TrFE);

chlorotrifluoroethylene (CTFE);

fluoroalkylvinylethers complying with formula CF$_2$=CFOR$_{f1}$ in which R$_{f1}$ is —CF$_3$,—C$_2$F$_5$, —C$_3$F$_7$;

hydrofluoroalkylvinylethers complying with formula CH$_2$=CFOR$_{f1}$ in which R$_{f1}$ is —CF$_3$, —C$_2$F$_5$, —C$_3$F$_7$;

fluoro-oxyalkylvinylethers complying with formula CF$_2$=CFOX$_0$, in which X$_0$ is perfluoro-2-propoxy-propyl;

fluoroalkyl-methoxy-vinylethers complying with formula CF$_2$=CFOCF$_2$OR$_{f2}$ in which R$_{f2}$ is -CF$_3$, —C$_2$F$_5$, —C$_3$F$_7$, or -C$_2$F$_5$—O—CF$_3$;

fluorodioxoles, of formula:

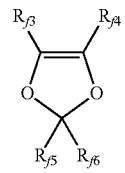

wherein each of R$_{f3}$, R$_{f4}$, R$_{f5}$, R$_{f6}$, equal or different each other, is independently a fluorine atom, —CF$_3$, —C$_2$F$_5$, —C$_3$F$_7$, —OCF$_3$, or —OCF$_2$CF$_2$OCF$_3$.

11. The (per)fluoroelastomer composition of claim 1, wherein (per)fluoroelastomer (A) is selected from the group consisting of:

(1) VDF-based copolymers, in which VDF is copolymerized with at least one comonomer selected from:

(a) tetrafluoroethylene (TFE), hexafluoropropylene (HFP), hexafluoroisobutylene;

(b) vinyl fluoride (VF), trifluoroethylene (TrFE), perfluoroalkyl ethylenes of formula CH$_2$=CH-R$_f$ wherein R$_f$ is a C$_1$-C$_6$ perfluoroalkyl group;

(c) chlorotrifluoroethylene (CTFE);

(d) (per)fluoroalkylvinylethers (PAVE) of formula CF$_2$=CFOR$_f$ wherein R$_f$ is CF$_3$, C$_2$F$_5$ or C$_3$F$_7$;

(e) (per)fluoro-oxy-alkylvinylethers of formula CF$_2$=CFOX, wherein X is a perfluoro-2-propoxypropyl group;

(f) (per)fluorodioxoles of formula:

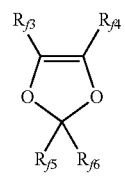

wherein R$_{f3}$, R$_{f4}$, R$_{f5}$, R$_{f6}$, equal or different from each other, are independently selected from the group consisting of fluorine atoms, -CF$_3$, —C$_2$F$_5$, —C$_3$F$_7$, —OCF$_3$, and —OCF$_2$CF$_2$OCF$_3$;

(g) (per)fluoro-methoxy-vinylethers (MOVE) of formula:

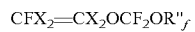

wherein X$_2$ is F and R"$_f$ is —CF$_2$CF$_3$ (MOVE1); —CF$_2$CF$_2$OCF$_3$ (MOVE2); or —CF$_3$ (MOVE3); and (h) ethylene and propylene; and (2) TFE-based copolymers, in which TFE is copolymerized with at least one comonomer chosen from classes (c), (d), (e), (g), (h) as above detailed and the followings:

(c) chlorotrifluoroethylene (CTFE);

(d) (per)fluoroalkylvinylethers (PAVE) of formula CF$_2$=CFOR$_f$ wherein R$_f$ is CF$_3$, C$_2$F$_5$ or C$_3$F$_7$;

(e) (per)fluoro-oxy-alkylvinylethers of formula $CF_2=CFOX$, wherein X is a perfluoro-2-propoxypropyl group;

(g) (per)fluoro-methoxy-vinylethers (MOVE) of formula:

$$CFX_2=CX_2OCF_2OR''_f$$

wherein $X_2$ is F and $R''_f$ is —$CF_2CF_3$ (MOVE1); —$CF_2CF_2OCF_3$ (MOVE2); or —$CF_3$ (MOVE3); and (h) ethylene and propylene.

12. The (per)fluoroelastomer composition of claim 5, wherein j is an integer between 4 and 8.

13. The (per)fluoroelastomer composition of claim 5, wherein E is a —$(CF_2)_m$— group and m is an integer from 3 to 5.

14. The (per)fluoroelastomer composition of claim 8, wherein $X_f$ and $X'_f$, equal or different from each other are selected from the group consisting of —F and $C_1$-$C_{12}$ perfluoroalkyl or perfluoroaryl groups.

15. The (per)fluoroelastomer composition of claim 8, wherein $R_{1a}$, $R_{2a}$, $R_{3a}$, $R_{4a}$, $R_{5a}$, $R_{6a}$, $R_{7a}$, $R_{8a}$, equal to or different from each other, are selected from F, Cl, H, perfluoroalkyl or (per)fluorooxyalkyl, said substituents $R_{1a}$-$R_{8a}$ optionally containing one or more functional groups.

* * * * *